(12) United States Patent
Garcia et al.

(10) Patent No.: US 6,724,762 B2
(45) Date of Patent: *Apr. 20, 2004

(54) SYSTEM AND METHOD FOR IMPLEMENTING MULTI-PATHING DATA TRANSFERS IN A SYSTEM AREA NETWORK

(75) Inventors: David J. Garcia, Los Gatos, CA (US); Richard O. Larson, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 10/280,772

(22) Filed: Oct. 25, 2002

(65) Prior Publication Data

US 2003/0053462 A1 Mar. 20, 2003

Related U.S. Application Data

(63) Continuation of application No. 09/224,114, filed on Dec. 30, 1998, now Pat. No. 6,493,343.
(60) Provisional application No. 60/070,650, filed on Jan. 7, 1998.

(51) Int. Cl.[7] .......................... H04L 12/28; H04L 12/56; H04L 12/66; G06F 15/167; H04J 3/00
(52) U.S. Cl. ...................... 370/394; 709/213; 370/463; 370/476
(58) Field of Search .............................. 370/235–236.2, 370/389, 394, 419, 464–465, 479, 463, 476; 709/201, 203, 213, 217–219

(56) References Cited

U.S. PATENT DOCUMENTS

| | | | | | |
|---|---|---|---|---|---|
| 5,563,879 | A | * | 10/1996 | Sanders et al. | 370/474 |
| 5,802,050 | A | * | 9/1998 | Petersen et al. | 370/394 |
| 5,991,797 | A | * | 11/1999 | Futral et al. | 709/216 |
| 6,411,621 | B1 | * | 6/2002 | Norton et al. | 370/394 |
| 6,493,343 | B1 | * | 12/2002 | Garcia et al. | 370/394 |
| 6,557,048 | B1 | * | 4/2003 | Keller et al. | 710/6 |
| 2002/0029305 | A1 | * | 3/2002 | Satran et al. | 710/33 |

* cited by examiner

*Primary Examiner*—Seema S. Rao
*Assistant Examiner*—Kevin C. Harper

(57) ABSTRACT

A system and method for facilitating both in-order and out-of-order packet reception in a SAN includes requestor and responder nodes that maintain local copies of a message sequence number. Each request packet includes an ordering field specifying whether the packets must be received in-order. The request node includes a copy of the local sequence number in each packet transmitted and increments its local copy of the sequence number only for packets that must be received in order. The responder node includes the received message sequence number in all response packets and increments its local copy of the message sequence number only if the ordering field specifies that the packets must be received in order.

20 Claims, 3 Drawing Sheets

Sequence Number Example

Four Logical Paths between SNet II Endnodes

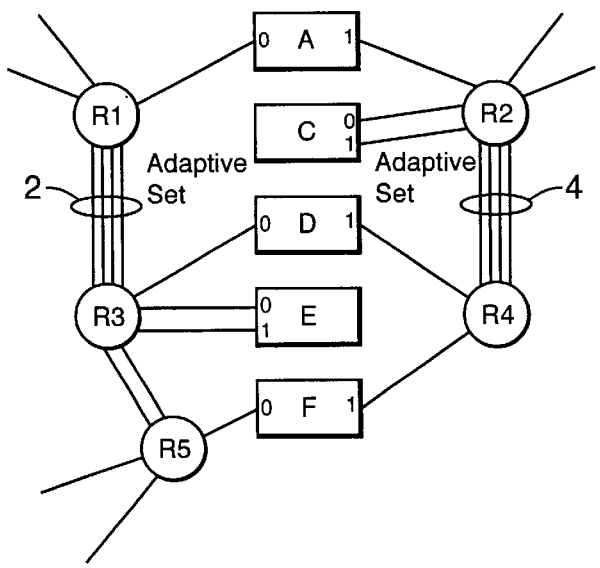
FIG. 5
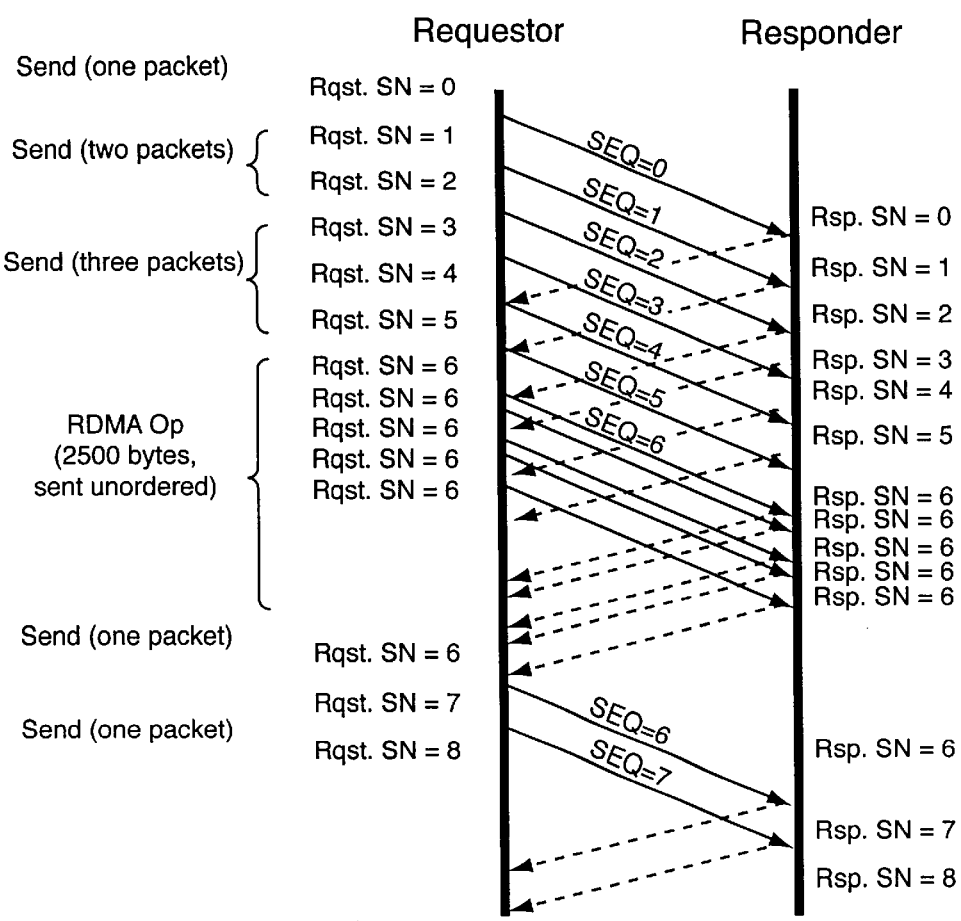
FIG. 6    Sequence Number Example

SYSTEM AND METHOD FOR IMPLEMENTING MULTI-PATHING DATA TRANSFERS IN A SYSTEM AREA NETWORK

REFERENCES TO EARLIER APPLICATIONS

The present application is a continuation of and incorporates by reference U.S. application Ser. No. 09/224,114 entitled "System And Method for Implementing Multipathing Data Transfers in a System Area Network", filed Dec. 30, 1998 now U.S. Pat. No. 6,493,343, which claims the benefit of and incorporates by reference U.S. Provisional Application No. 60/070,650, filed Jan. 7, 1998.

BACKGROUND OF THE INVENTION

Traditional network systems utilize either channel semantics (send/receive) or memory semantics (DMA) model. Channel semantics tend to be used in I/O environments and memory semantics in processor environments.

In the channel semantics model, the sender does not know where data is to be stored, it just puts the data on the channel. On the sending side, the sending process specifies the memory regions that contain the data to be sent. On the receiving side, the receiving process specifies the memory regions where the data will be stored.

In the memory semantics model, the sender directs data to a particular location in memory utilizing remote direct memory access (RDMA) transactions. The initiator of the data transfer specifies both the source buffer and destination buffer of the data transfer. There are two types of RDMA operations, read and write.

The virtual interface architecture (VIA) has been jointly developed by a number of computer and software companies. VIA provides consumer processes with a protected, directly accessible interface to network hardware, termed a virtual interface. VIA is especially designed to provide low latency message communication over a system area network (SAN) to facilitate multi-processing utilizing clusters of processors.

A SAN is used to interconnect nodes within a distributed computer system, such as a cluster. The SAN is a type of network that provides high bandwidth, low latency communication with a very low error rate. SANs often utilize a fault-tolerant network to provide continued message communications in the event of failure.

It is important for the SAN to provide high reliability and high-bandwidth, low latency communication to fulfill the goals of the VIA.

SUMMARY OF THE INVENTION

According to one aspect of the present invention, a SAN maintains local copies of a sequence number for each data transfer transaction at the requestor and responder nodes. Each data transfer is implemented by the SAN as a sequence of request/response packet pairs. An error condition arises if a response to any request packet is not received at the requesting node. Each request packet includes an ordering field which specifies whether or not the packets must be received at the responder in the order that they were sent. At the requestor and responder nodes, the local copy of the sequence number is incremented only if the ordering field in the packet sent or received, respectively, specifies that the packets must be received in the order sent.

According to another aspect of the invention, a sliding window protocol is utilized that allows a requester to continue to send a specified number of request packets before receiving the matching response packets.

According to another aspect of the invention, RDMA transactions may be implemented utilizing multiple paths to increase bandwidth.

Other features and advantages of the invention will be apparent in view of the following detailed description and appended drawings.

BRIEF DESCRIPTION OF THE DRAWINGS

FIG. 5 is a schematic diagram depicting routers and links connecting SAN end nodes; and FIG. 6 is a graph depicting the transmission of request and response packets between a requestor and a responder end node. FIG. 6 shows the sequence numbers used in packets for three Send operations, an RDMA operation, and two additional Send operations. The diagram shows the sequence numbers maintained in the requestor logic, the sequence number contained in each packet, and the sequence numbers maintained at the responder logic.

DESCRIPTION OF THE SPECIFIC EMBODIMENTS

Figure 1:
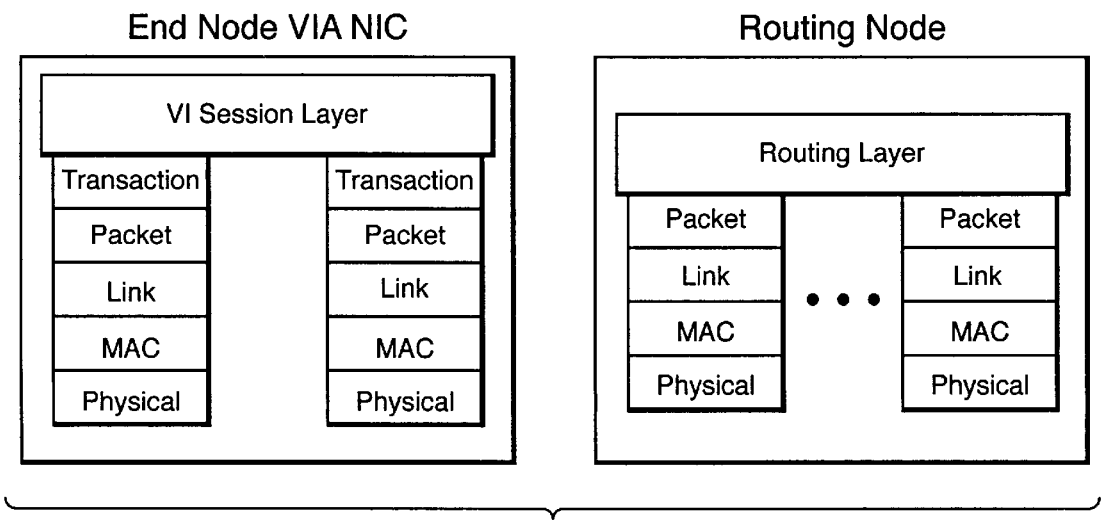
FIG. 1 is a block diagram depicting ServerNet protocol layers implemented by hardware, where ServerNet is a SAN manufactured by the assignee of the present invention.

The preferred embodiments will be described implemented in the ServerNet II (ServerNet) architecture, manufactured by the assignee of the present invention. The ServerNet protocol is a layered transport protocol for a System Area Network (SAN) optimized to support the Virtual Interface (VI) architecture session layer which has stringent user-space to user-space latency and bandwidth requirements. These requirements mandate a reliable hardware (HW) message transport solution with minimal software (SW) protocol stack overhead. The ServerNet II protocol layers for an end node VI Network Interface controller/Card (NIC) and for a routing node are illustrated in FIG. 1. A single NIC and VI session layer may support one or two ports, each with its associated transaction, packet, link-level, MAC (media access) and physical layer. Similarly, routing nodes with a common routing layer may support multiple ports, each with its associated link-level, MAC and physical layers.

Figure 2:
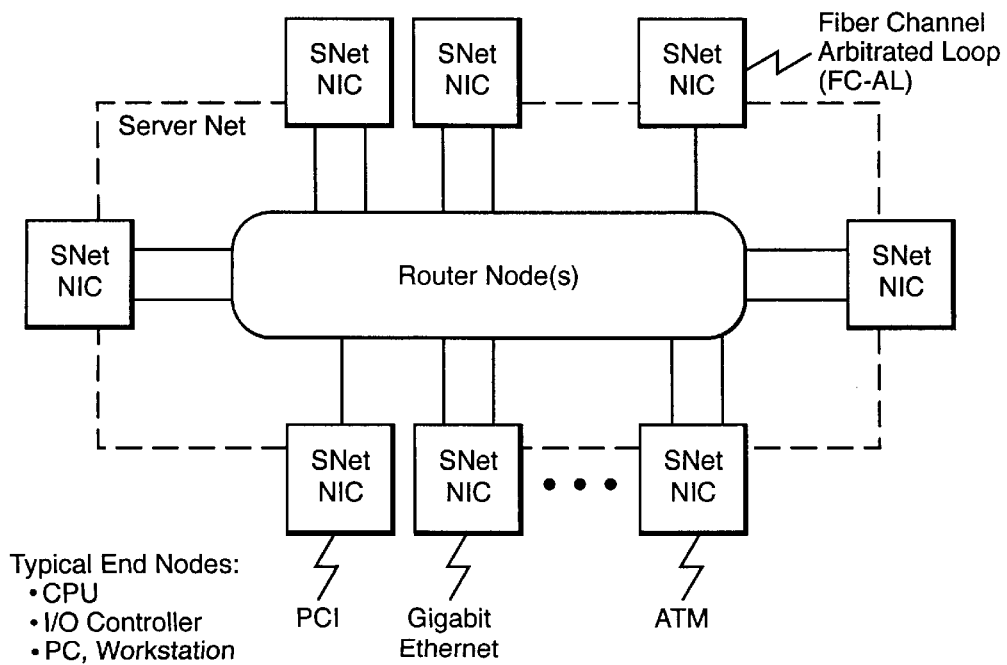
FIGS. 2 and 3 are block diagrams depicting SAN topologies.
Figure 3:
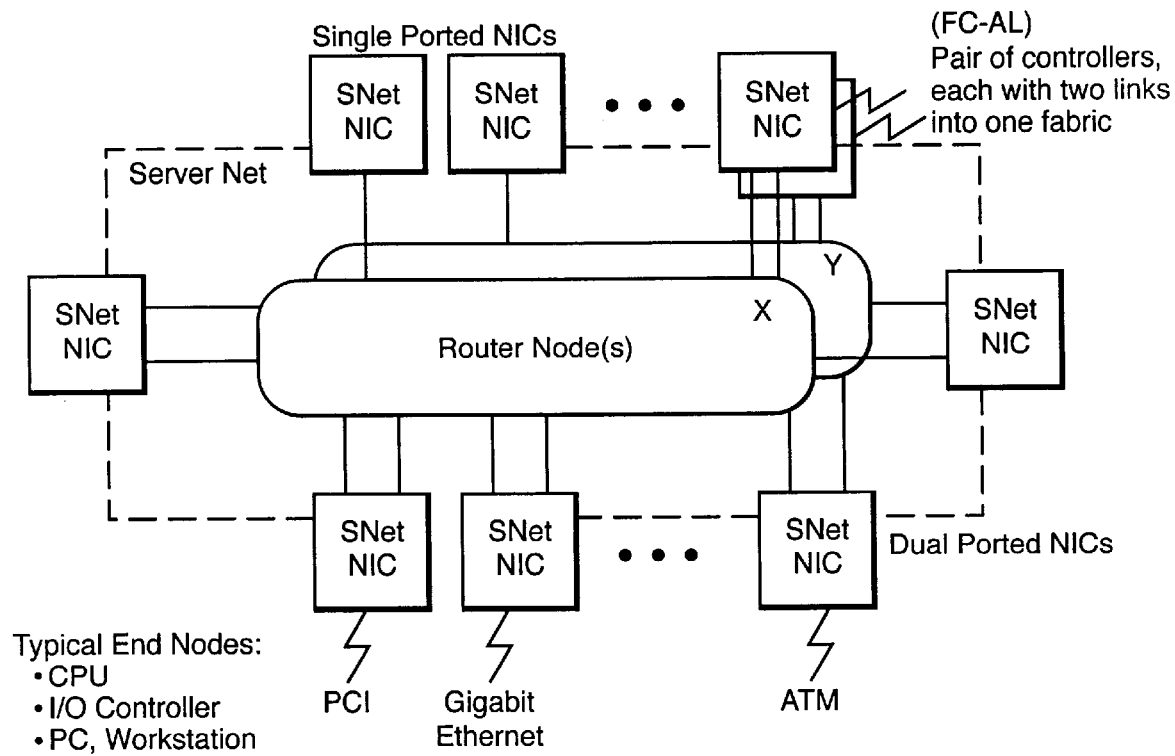

Support for two ports enables ServerNet II SAN to be configured in both non-redundant and redundant (fault tolerant, or FT) SAN configurations as illustrated in FIG. 2 and FIG. 3. On a fault tolerant network, a port of each end node may be connected to each network to provide continued VI message communication in the event of failure of one of the SANs. In the fault tolerant SAN, nodes may also be ported into a single fabric or single ported end nodes may be grouped into pairs to provide duplex FT controllers. The fabric is the collection of routers, switches, connectors, and cables that connects the nodes in a network.

The following describes general ServerNet II terminology and concepts. The use of the term "layer" in the following description is intended to describe functionality and does not imply gate level partitioning.

Two ports are supported on a NIC for both performance and fault tolerance reasons. Both of these ports operate under the same session layer VIA engine. That is, data may arrive on any port and be destined for any VI. Similarly, the VIs on the end node can generate data for any of these ports.

ServerNet II packets are comprised of a series of data symbols followed by a packet framing command. Other commands, used for flow control, virtual channel support, and other link management functions, may be embedded within a packet. Each request or response packet defines a variety of information for routing, transaction type, verification, length and VI specific information.

i. Routing in the ServerNet II SAN is destination based using the first 3 bytes (24 bits) of the packet. Each NIC end node port in the network is uniquely defined by a 20-bit Port SNID (ServerNet Node ID). The first 3 bytes of a packet contain the Destination port's SNID or DID (destination port ID) field, a three bit Adaptive Control Bits (ACB) field and the fabric ID bit. The ACB is used to specify the path (deterministic or link-set adaptive) used to route the packet to its destination port as described in the following section.

ii. The transaction type fields define the type of session layer operation that this ServerNet II packet is carrying and other information such as whether it is a request or a response and, if a response, whether it is an Ack (acknowledgement) or a Nack (negative acknowledgment). The ServerNet II SAN also supports other transaction types.

iii. Transaction verification fields include the source port ID (SID) and a Transaction Serial Number. The transaction serial number enables a port with multiple requests outstanding to uniquely match responses to requests.

iv. The Length field consists of an encoding of the number of bytes of payload data in the packet. Payloads up to 512 bytes are supported and code space is reserved for future increases in payload size.

v. The VI Session Layer specific fields describe VI information such as the VI Operation, the VIA Sequence number, and the Virtual Interface ID number. The VI Operation field defines the type of VI transaction being sent (Send, RDMA Read, RDMA Write) and other control information such as whether the packet is ordered or unordered, whether there is immediate data and/or whether this is the first or last packet in a session layer multi-packet transfer. Based on the VI transaction type and control information, a 32 bit Immediate data field or a 64 bit Virtual address may follow the VI ID number.

vi. The payload data field carries up to 512 bytes of data between requesters and responders and may contain a pad byte.

vii. The CRC field contains a checksum computed over the entire packet.

Transaction Overview

The basic flow of transactions through the ServerNet II SAN will now be described. VI requires the support of Send, RDMA read and RDMA write transactions. These are translated by the VI session layer into a set of ServerNet II transactions (request/response packet pairs). All data transfers (e.g., reading a disk file to CPU memory, dumping large volumes of data from a disk farm directly over a high-speed communications link, one end node simply interrupting another) consist of one or more such transactions.

Creating a Request Packet

The VI User Agent provides the low level routines for VIA Send, RDMA Write, and RDMA Read operations. These routines place a descriptor for the desired transfer in the appropriate VI queue and notify the VIA hardware that the descriptor is ready for processing. The VIA hardware reads the descriptor, and based on the descriptor contents, builds the ServerNet request packet header and assembles the data payload (if appropriate).

Dual Ports and Ordering

In a NIC with two ports, it is possible for a single VIA interface to process Sends and RDMA operations from several different VIs in parallel. It is also possible for a large RDMA transfer from a single VI to be transferred on both of the ports simultaneously. This latter feature is called Multi-pathing.

Figure 4:
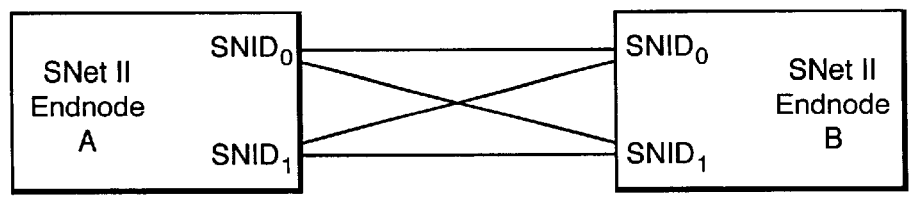
FIG. 4 is a schematic diagram depicting logical paths between end nodes of a SAN.

ServerNet II end nodes can connect both their ports to a single network fabric so that there are up to four possible paths between ServerNet II end nodes. Each port of a single end node may have a unique ServerNet ID (SNID). FIG. 4 depicts the four possible paths that End node A can use when sending request to End node B:

1) End node A SNID[0] to End node B SNID[0]
2) End node A SNID[0] to End node B SNID[1]
3) End node A SNID[1] to End node B SNID[0]
4) End node A SNID[1] to End node B SNID[1]

FIG. 5 depicts a network topology utilizing routers and links. In FIG. 5, end nodes A–F, each having first and second send receive ports 0 and 1, are coupled by a ServerNet topology including routers R1–R5. Links are represented by lines coupling ports to routers or routers to routers. For example, a first adaptive set (fat pipe) 2 couples routers R1 and R3 and a second adaptive set (fat pipe) 4 couples routers R2 and R4.

Routing may be deterministic or link set adaptive. An adaptive link-set is a set of links (also called lanes) between two routers that have been grouped to provide higher bandwidth. The Adaptive Control Bits (ACB) specify which type of routing is in effect for a particular packet.

Deterministic routing preserves strict ordering for packets sent from a particular source port to a destination port. In deterministic routing the ACB field selects a single path or lane through an adaptive link-set. Send transactions for a particular VI require strict ordering and therefore use deterministic routing.

RDMA transactions, on the other hand, may make use of all possible paths in the network without regard for the ordering of packets within the transaction. These transactions may use link-set adaptive routing as described below. The ACB field specifies which specific link (or lane) in this link-set is to be used for deterministic routing.

Alternatively, the ACB field can specify link-set adaptivity which enables the packets to dynamically choose from any of the links in the link-set.

A sample topology with several different examples of multi-pathing using link and path adaptivity is shown in FIG. 5.

Multi-pathing allows large block transfers done with RDMA Read or Write operations to simultaneously use both ports as well as adaptive links between the two communicating NICs. Since the data transfer characteristics of any one VI are expected to be bursty, multi-pathing allows the end node to marshal all its resources for a single transfer. Note that multi-pathing does not increase the throughput of multiple Send operations from one VI. Sends from one VI must be sent strictly ordered. Since there are no ordering guarantees between packets originating from different ports on a NIC, only one port may be used per Send. Furthermore, only a single ordered path through the Network may be used, as described in the following.

Transaction and Packet Layers

The transaction layer builds the ServerNet II request packet by filling in the appropriate SID, Transaction Serial Number (TSN), and CRC. The SID assigned to a packet always corresponds to the SNID of the port that the packet originates from. The TSN can be used to help the port manage multiple outstanding requests and match the resulting responses uniquely to the appropriate request. The CRC enables the data integrity of the packet to be checked at the end node and by routers enroute.

Following the ServerNet II link protocol, the packet is encoded in a series of data symbols followed by a status command. The ServerNet II link layer uses other commands for flow control and link management. These commands may be inserted anywhere in the link data stream, including between consecutive data symbols of a packet. Finally, the symbols are passed through the MAC layer for transmission on the physical media to an intermediate routing node.

Routing

The routing control function is programmable so that the packet routing can be changed as needed when the network configuration changes (e.g., route to new end nodes). Router nodes serve as crossbar switches; a packet on any incoming (receive) side of a link can be switched to the outgoing (transmit) side of any link. As the incoming request packet arrives at a router node, the first three bytes, containing the DID, and ACB fields, are decoded and used to select a link leading to the destination node. If the transmit side of the selected link is not busy, the head of the packet is sent to the destination node whether or not the tail of the packet has arrived at the routing node. If the selected link is busy with another packet, the newly arrived packet must wait for the target port to become free before it can pass through the crossbar.

As the tail of the packet arrives, the router node checks the packet CRC and updates the packet status (good or bad). The packet status is carried by a link symbol TPG (this packet good) or TPB (this packet bad) appended at the end of the packet. Since packet status is checked on each link, a packet status transition (good to bad) can be attributed to a specific link. The packet routing process described above is repeated for each router node in the selected path to the destination node.

Receiving a Request Packet

When the request packet arrives at the destination node, the ServerNet II interface receiver checks its validity (e.g., must contain correct destination node ID, the length is correct, the Fabric bit in the packet matches the Fabric bit associated with the receiving port, the request field encodes a valid request, and CRC must be good,). If the packet is invalid for any reason, the packet is discarded. The ServerNet II interface may save error status for evaluation by software. If these validity checks succeed, several more checks are made. Specifically, if the request specifies an RDMA Read or Write, the address is checked to ensure access has been enabled for that particular VI. Also, the input port and Source ID of the packet are checked to ensure access to the particular VI is allowed on that input port from the particular Source. If the packet is valid, the request can be completed.

Response Packet

A response is created based on the success (ACK response) or failure (NACK response) of the request packet. A successful read request, for example, would include the read data in the ACK response. The source node ID from the request packet is used as the destination node ID for the response packet. The response packet must be returned to the original source port. The path taken by the response is not necessarily the reverse of the path taken by the request. The network may be configured so that responses take very different paths than requests. If strict ordering is not required, the response, like the request, may use link-set adaptivity. The response packet is routed back to the SNID specified by the SID field of the request. The ACB field of the request packet is also duplicated for the response packet.

The response can be matched with the request using the TSN and the packet validity checks. If an ACK response passes these tests, the transaction layer passes the response data to the session layer, frees resources associated with the request, and reports the transaction as complete. If a NACK response passes these tests, the end node reports the failure of the transaction to the session layer. If a valid ACK/NACK response is not received within the allotted time limit, a time-out error is reported.

The requestor can stream many strictly ordered ServerNet II messages onto the wire before receiving an acknowledgment. The sliding window protocol allows the requester to have up to 128 packets outstanding per VI.

The hardware can operate in one of two modes with respect to generating multiple outstanding request packets:

1. The hardware can stream packets from the same VI send queue onto the wire, and start the next descriptor before receiving all the acknowledgments from the current descriptor. This is referred to as "Next Descriptor After Launch" or NDAL.

2. The hardware can stream packets to a single descriptor onto the wire but wait for all the outstanding acknowledgments to complete before starting the next descriptor. This is referred to as "Next Descriptor after Ack" or NDAA.

The choice of NDAL or NDAA modes of operation is determined by how strongly ordered the packets are generated.

Ordered and unordered messages may be mixed on a single VI. When generating an unordered message, the requester must wait for completion of all acknowledgments to unordered packets before starting the next descriptor.

Ordering of Send Packets Presented to Transaction Layer

The VI architecture has no explicit ordering rules as to how the packets that make up a single descriptor are ordered among themselves. That is, VIA only guarantees the message ordering the client will see. For example, VIA requires that Send descriptors for a particular VI be completed in order, but the VIA specification doesn't say how the packets will proceed on the wire.

The ServerNet II SAN requires that all Send packets destined for a particular VI be delivered by the SAN in strict order. As long as deterministic routing is used, the network assures strict ordering along a path from a particular source node to a particular destination node. This is necessary because the receiving node places the incoming packets into a scatter list. Each incoming packet goes to a destination determined by the sum total of bytes of the previous packets. The strict ordering of packets is necessary to preserve integrity of the entire block of data being transferred because incoming packets are placed in consecutive locations within the block of data. Each packet has a sequence number to allow the receiver to detect an out of order, missing, or repeated packet.

There are two ways for an end node to meet these ordering requirements:

a. The end node can wait for the acknowledgment from each Send packet to complete before starting another Send packet for that VI. By waiting for each acknowledgment the end node doesn't have to worry about the network providing strict ordering and can choose an arbitrary source port, adaptive link set, and destination port for each message.

b. The end node can restrict all the Send operations for a given VI to use the same source port, the same destination port, and a single adaptive path. By choosing only one path through the network, the end node is guaranteed that each Send packet it launches into the network will arrive at the destination in order.

The second approach requires the VIA end node to maintain state per VI that indicates which source port destination port and adaptive path is currently in use for that particular VI. Furthermore, the second approach allows the hardware to process descriptors in the higher performance NDAL mode. With the second approach, Send packets from a single VI can stream onto the network without waiting for their accompanying acknowledgments. An incrementing sequence number is used so the destination node can detect missing, repeated, or unordered Send packets.

Ordering of RDMA Packets

RDMA operations have slightly different ordering requirements than Send operations. An RDMA packet contains the address to which the destination end node writes the packet contents. This allows multiple RDMA packets within an RDMA message to complete out of order. The contents of each packet are written to the correct place in the end node's memory, regardless of the order in which they complete.

RDMA request packets may be sent ordered or unordered. A bit in the packet header is set to a 1 for ordered packets and is set to a 0 for unordered packets. As will be explained later, this bit is used by the responder logic to determine if it should increment its copy of the expected sequence number. Sequence numbers do not increment for unordered packets. The end node is free to use different source ports, destination ports and adaptive paths for the packets. This freedom can be exploited for a performance gain through multi-pathing; simultaneously sending the RDMA packets of a single message across multiple paths.

When RDMA Read or Write packets are sent over a path that does not exhibit strict ordering with the Send packets from the same VI, care must be taken when launching packets for the following message. The next message cannot be started until the last acknowledgment of the RDMA Read or Write operation successfully completes.

In other words, when multi-pathing is used to generate RDMA Read or Write requests, the hardware must operate in the NDAA mode. This ensures the RDMA Read or Write is completed before moving on to subsequent descriptors.

An end node may choose to send RDMA packets strictly ordered. This can be advantageous for smaller RDMA transfers as the hardware can operate in NDAL mode. The VI can proceed to the next descriptor immediately after launching the last packet of a message that is sent strictly ordered (and hence used incrementing sequence numbers).

Ordering of Generated Response Packets at the Responder

The ServerNet II end node must respond to incoming Send requests and RDMA Write requests from a particular VI in strict order, and must write these packets to memory in strict order.

The ServerNet II end node must also respond to incoming RDMA Read requests from a particular VI in strict order. Because response packets are transported by the network in strict order, the requestor will receive all incoming response packets for a particular VI in the same order as that in which the corresponding requests were generated.

VIA Message Sequence Numbers

The ServerNet SAN uses acknowledgment packets to inform the requestor that a packet completed successfully. Sequence numbers in the packets (and acknowledgments) are used to allow the sender to support multiple outstanding requests to ensure adequate performance and to be able to recover from errors occurring in the network.

FIG. 6 is a graph depicting the generation, checking, and updating of VIA sequence numbers at requestor and responder nodes. In FIG. 6 time increases in the downward direction. Requests are indicated by solid arrows directed to the right and responses by dotted arrows directed to the left.

Sequence Number Initialization

The requester and responder logic each maintain an 8 bit sequence number for each VI in use. When the VI is created, the requester on one node and the responder on the remote node initialize their sequence numbers to a common value, zero in the preferred embodiment.

After this, the requestor places its sequence number into each of the outgoing request packets. As depicted in FIG. 6, the sequence number, SEQ, is included in each request packet. The responder compares the sequence number from the incoming request packet with the responder's local copy. The responder uses this comparison to determine if the packet is valid, if it is a duplicate of a packet already received, or if it is an out-of-sequence packet. An out-of-sequence packet can only happen if the responder missed an incoming packet. The responder can choose to return a 'sequence error NACK packet' or it can simply ignore the out-of-sequence packet. In the latter case, the requestor will have a timeout on the request (and presumably on the packet the responder missed) and initiate error recovery. Generating a Sequence Error NACK Packet is preferred as it forces the requestor to start error recovery more quickly.

The following describes how the sequence numbers are generated and checked.

Generating Sequence Numbers for Request Packets

When transmitting ordered packets (i.e. transfers are on a specific source port to a specific destination port and the ACB specifies a specific lane) the request sequence number is incremented after each packet is sent. When transmitting unordered packets (i.e. multi-pathing is used and/or the ACB bits specify full link set adaptivity) the request sequence number is not incremented after such a packet is sent.

For example, in FIG. 6, during the first two Send transactions, the local copy of the request sequence number is incremented after the packet is sent (Rqst. SN=0 to 6). For the RDMA operation, which sends 2500 bytes unordered, the requestor does not increment local copy of the request sequence number (Rqst. SN=6). The requester does not increment the local copy of the SN until after the first packet of the Send following the RDMA is transmitted.

Send packets are typically sent fully ordered lest the requester have to wait for an acknowledgment for each packet before proceeding to the next. On the other hand, RDMA packets may be sent either ordered or unordered. To take advantage of multi-pathing, a requestor must use unordered RDMA packets.

The sender guarantees to never exceed the windowsize number of packets outstanding per VI. If S is the number of bits in the sequence number, then the windowsize is 2**(S−1).

A packet is outstanding until it and all its predecessors are acknowledged. The requestor does not mark a descriptor done until all packets requested by that descriptor are positively acknowledged.

Checking Sequence Numbers on Incoming Request Packets

The destination node responding to the incoming request packet checks each incoming request packet to verify its sequence number against the responder's local copy.

The responder logic compares its sequence number with the packet's sequence number to determine if the incoming packet is either:

- the expected packet it's looking for (i.e., the packet's sequence number is the same as the sequence number maintained by the responder logic), in which case the responder processes the packet and if all other checks are passed, the packet is Acknowledged and committed to memory. If the transaction is ordered then the responder then increments its sequence number. If the transaction is unordered than the responder does not increment its sequence number;
- an out-of-sequence packet (which means an earlier incoming packet must have gotten lost), beyond the one it is looking for in which case the responder NACKS the packet and throws it away. The receive logic in the VI is not stopped and the responder does not increment its sequence number; or
- a duplicate packet (which is being resent because the requestor must not have received an earlier Ack) in which case the responder Acks the packet and throws it away. If the request had been an RDMA Read, the responder completes the read operation and returns the data with a positive acknowledgment.

An example of the responder checking sequence numbers for ordered and unordered packets is given in FIG. 6. In FIG. 6, during the first two Send transactions, the responder checks that the SEQ in the packet matches the local copy of Rsp. SN. Since the Send packets include ACB indicating ordered then the Rsp. SN is incremented after each response packet is transmitted. At the end of the first two Send transactions, Rqst. SN and Rsp. SN are both equal to 6. The packets for the RDMA include an ACB indicating unordered receipt is allowed. Neither the requestor nor responder increments its local copy of SN. Thus, at the end of the RDMA transaction, both Rqst. SN and Rsp. SN=6. The first packet of the subsequent Send transaction has SEQ =6 and SEQ matches the local copy of Rsp. SN. Since Send packets are ordered, the responder increments its local copy of Rsp. SN.

Sequence Numbers on Response Packets

When generating either a positive or negative acknowledgment, the responder logic copies the incoming sequence number and uses it in the sequence number field of the acknowledgment.

The requestor logic matches incoming responses with the originating request by comparing the SourceID, VI number, Sequence number, transaction type, and Transaction Serial Number (TSN) with that of the originating request.

The invention has now been described with reference to the preferred embodiments. Alternatives and substitutions will now be apparent to persons of skill in the art. For example, the invention has been described in the context of the ServerNet II SAN, the principles of the invention are useful in any network that services both memory semantics and channel semantics or uses multi-pathing. Accordingly, it is not intended to limit the invention except as provided by the appended claims.

What is claimed is:

1. In a system area network (SAN) interconnecting a requestor and a responder, a sub-system for managing ordered transactions requiring strict ordering of packet reception and remote direct memory access that allow out-of-order receipt of packets, the sub-system comprising:

a first network interface card (NIC) interconnecting the requestor and the SAN for transferring a request packet from the requestor to the responder, the first NIC being configured to locally maintain a request sequence number for the request packet and to provide the request packet with the request sequence number and a packet order field that is set to a first value or a second value, wherein the first value specifies an ordered transaction requiring packets to be received in order in which case the request sequence number is incremented for each transferred request packet, and wherein the second value specifies an unordered transaction allowing packets to be received out-of-order in which case the request sequence number remains unchanged with transmission of request packets; and a second NIC interconnecting the responder to the SAN for receiving the request packet and transferring a response packet, the second NIC being configured to locally maintain a response sequence number that is incremented subsequent to sending the response packet if the packet order field of the corresponding received request packet is set to the first value and is not incremented if the packet order field is set to the second value.

2. The sub-system of claim 1 wherein the first NIC is configured to locally maintain a packet sequence number equal to the request sequence number and transfer the packet sequence number to the second NIC such that if the packet sequence number is equal to the response sequence number, the second NIC is configured to copy the packet sequence number into a corresponding response packet and increment the local value of the request sequence number subsequent to sending the response packet.

3. The sub-system of claim 1 wherein the first NIC is configured to transmit request packets prior to receiving any response packets.

4. The sub-system of claim 1 wherein the first NIC and the second NIC are coupled by a plurality of paths and the first value of the packet order field indicates that packets are transmitted over a single path and the second value indicates that packets are transmitted over the plurality of paths.

5. The sub-system of claim 1 wherein the response sequence number of the first NIC and the local response sequence number of the second NIC are initialized to a common value prior to data transfer.

6. In a system area network (SAN) interconnecting a requestor and a responder that transfer data as a sequence of request and response packets with a sub-system having a first network interface card (NIC) and a second NIC, a method for managing ordered transactions requiring strict ordering of packet reception and remote direct memory access that allows out-of-order receipt of packets, the method comprising the steps of:

at the first NIC of the subsystem,
generating a request packet, a packet order field, and a request sequence number,
setting the packet order field to a first value for an ordered transaction wherein packets are to be received in order and the request sequence number is incremented for each transferred request packet; and
setting the packet order field to a second value for an unordered transaction wherein packets are to be received out-of-order and the request sequence number remains unchanged with the transmission of request packets; and
at the second NIC of the subsystem,
receiving the request packet and transferring a response packet, and
maintaining a local response sequence number that is incremented subsequent to transferring the response packet if the packet order field of the received request packet is set to the first value and is not incremented if the packet order field is set to the second value.

7. The method of claim 6 further comprising the step of translating ordered transaction requests or direct memory access transaction requests into sequences of packets at the first NIC subsequent to generating the request sequence number for each transaction.

8. The method of claim 6 further comprising the step of generating a packet sequence number equal to the request sequence number at the first NIC.

9. The method of claim 8 further comprising the step of copying the packet sequence number from the received request packet into a corresponding response packet at the second NIC.

10. In a system area network (SAN) for data transfer of transaction packets between a requestor and a responder, a sub-system for managing ordered transactions and unordered transactions, the sub-system comprising:
a first network interface card (NIC) interconnecting the requestor and the SAN, the first NIC being configured to generate a request packet having a request sequence number corresponding to each request packet and a packet order field that has a first value specifying that packets of the transaction are ordered and a second value specifying that packets of the transaction are unordered such that if the packets of the transaction are ordered, the request sequence number is incremented upon transmitting the packet; and
a second NIC interconnecting the responder and the SAN, the second NIC being configured to generate a response packet for each request packet received and maintain a local request sequence number that is incremented if the packet order field of the corresponding received request packet is equal to the first value.

11. The sub-system of claim 10 wherein the first NIC is configured to generate and transmit a packet sequence number equal to the request sequence number and the second NIC is configured to copy the packet sequence number into a corresponding response packet.

12. The sub-system of claim 10 wherein the packets may be transmitted from the first NIC prior to receiving any response packet from the second NIC.

13. The sub-system of claim 10 wherein the first NIC and the second NIC are coupled by a plurality of paths and the first value of the packet order field indicates that the packets are transmitted over a single path and the second value of the packet order field indicates that the packets are transmitted over the plurality of paths.

14. The sub-system of claim 10 wherein:
the first NIC is configured not to increment the request sequence number if the packet order field is set to the second value; and
the second NIC is configured not to increment the local request sequence number if the packet order field is set to the second value.

15. The sub-system of claim 10 wherein the first NIC and the second NIC are configured to initialize request sequence numbers to a common value prior to packet transfer.

16. A sub-system to transfer packets of a transaction between a requestor and a responder of a system area network (SAN), the sub-system comprising:
first network interface means interconnecting the requestor and the SAN, the first network interface means for generating a request packet, a request sequence number corresponding to each request packet, and a packet order field for each transaction wherein the packet order field has a first value specifying that the transaction is an ordered transaction requiring the packets to be received in order such that the request sequence number is incremented upon transmitting the request packet and a second value specifying that the transaction is an unordered transaction allowing the packets to be received out-of-order; and
second network interface means interconnecting the requestor to the SAN, the second network interface means for generating a response packet for each request packet received and maintaining a local request sequence number that is incremented if the packet order field of the request packet is the first value.

17. The sub-system of claim 16 wherein the second network interface means is a network interface card coupled to a requestor node of the SAN.

18. The sub-system of claim 16 wherein the first network interface means is a network interface card coupled to a responder node of the SAN.

19. The sub-system of claim 16 wherein the first network interface means is configured to generate and transmit a packet sequence number equal to the request sequence number and the second network interface means is configured to copy the packet sequence number into a corresponding response packet.

20. The sub-system of claim 16 wherein the first network interface means and the second network interface means are coupled by a plurality of paths and the first value of the packet order field indicates that the packets are transmitted over single path and the second value of the packet order field indicates that the packets are transmitted over the plurality of paths.

* * * * *